United States Patent
Matsushita

(10) Patent No.: US 6,762,674 B2
(45) Date of Patent: Jul. 13, 2004

(54) ELECTRONIC SHELF LABEL SYSTEM

(75) Inventor: Naohiro Matsushita, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 479 days.

(21) Appl. No.: 09/825,006

(22) Filed: Apr. 3, 2001

(65) Prior Publication Data

US 2001/0028300 A1 Oct. 11, 2001

(30) Foreign Application Priority Data

Apr. 6, 2000 (JP) ........................................ 2000-105153

(51) Int. Cl.[7] .............................................. G06F 7/01
(52) U.S. Cl. ............................... 340/5.91; 340/825.52
(58) Field of Search ............................. 340/5.91, 5.61, 340/825.49, 52, 10.1, 31, 10.2, 6, 10.33, 10.42; 358/1.12, 1.15; 235/462.01, 492

(56) References Cited

U.S. PATENT DOCUMENTS

| 4,999,834 A | 3/1991 | Leo et al. |
| 5,697,061 A | 12/1997 | Krueger et al. |
| 5,797,132 A | 8/1998 | Altwasser |
| 5,841,365 A * | 11/1998 | Rimkus ...................... 340/5.61 |
| 5,870,714 A | 2/1999 | Shetty et al. |
| 6,597,465 B1 * | 7/2003 | Jarchow et al. ............ 358/1.12 |

FOREIGN PATENT DOCUMENTS

| EP | 0 851 632 A2 | 7/1998 |
| JP | 63-87837 | 4/1988 |
| WO | WO 92/16901 A1 | 10/1992 |

* cited by examiner

Primary Examiner—Michael Horabik
Assistant Examiner—William Bangachon
(74) Attorney, Agent, or Firm—Frishauf, Holtz, Goodman & Chick, P.C.

(57) ABSTRACT

An electronic shelf label (ESL) transmits a negative response to a radio relay station by means of weak radio waves if it failed to normally receive price information. On the other hand, the ESL transmits no response if it failed to normally receive both ID information and price information. The radio relay station transmits to a radio communication base station ID information of the ESL which transmitted no response and ID information of the ESL which transmitted the negative response. The radio communication base station transfers the received ID information to an electronic shelf label (ESL) server. The ESL server re-transmits via the radio communication base station information to the ESL which transmitted no response and the ESL which transmitted the negative response.

7 Claims, 7 Drawing Sheets

ELECTRONIC SHELF LABEL SYSTEM

CROSS-REFERENCE TO RELATED APPLICATIONS

This application is based upon and claims the benefit of priority from the prior Japanese Patent Application No. 2000-105153, filed Apr. 6, 2000, the entire contents of which are incorporated herein by reference.

BACKGROUND OF THE INVENTION

The present invention relates to an electronic shelf label system (ESL system) for radio-controlling a plurality of electronic shelf labels which are disposed on shelves or products such as goods and which display information on products such as the names of products and the prices of products.

FIG. 9 shows a conventional electronic shelf label system for radio-controlling a plurality of electronic shelf labels.

According to this ESL system, a k-number of shelves 1-1, 1-2, ..., 1-$k$ are arranged on a sales floor, and an n-number of electronic shelf labels (ESLs) 2-1, 2-2, 2-3, ..., 2-$n$ are disposed on the k-number of shelves 1-1, 1-2, ..., 1-$k$.

In addition, according to this ESL system, an electronic shelf label server (ESL server) 3 for managing the ESLs 2-1 to 2-$n$ is installed in an office, etc., and a radio communication base station 5 is connected to the ESL server 3 via a wired network 4. The radio communication base station 5 is disposed, for example, on the ceiling of the sales space.

The radio communication base station 5 has a function of performing bidirectional radio communication between itself and the ESLs 2-1 to 2-$n$ of the shelves 1-1 to 1-$k$ in a "1-to-n" relationship in the range of about 30 m in radius. Each of the ESLs 2-1 to 2-$n$ has a liquid crystal display (LCD) for displaying a products price.

The ESL server 3 manages products information. The products information is associated with ID information of the ESLs which display the products information. The products information is radio-transmitted to each ESL, 2-1 to 2-$n$, via the radio communication base station 5.

Each ESL, 2-1 to 2-$n$, detects the ID information contained in the received information, selects information directed to its own address, and displays products information on the LCD.

Each ESL, 2-1 to 2-$n$, radio-transmits an affirmative response to the radio communication base station 5 if the reception result is correct, and a negative response to the base station 5 if the reception result is incorrect. On the other hand, each ESL, 2-1 to 2-$n$, radio-transmits no response to the radio communication base station 5 if the ESL is unable to confirm, owing to bad condition of reception, that the received information is directed to its own address.

In the ESL system, the radio communication base station 5 is required to exactly perform bidirectional communication between itself and the ESLs 2-1 to 2-$n$ within a range of about 30 m in radius. If a frequency band of, e.g. 2.4 GHz is used by the radio communication base station 5 and the ESLs 2-1 to 2-$n$, a transmission power of about 10 mW is necessary.

However, in order that the ESL may output a transmission power of 10 mW which is out of the range of weak radio wave standards, it is required to obtain legal recognition for wireless LAN apparatuses. In order to acquire such recognition, there is a problem in that some strict technical conditions need to be satisfied, for example, conditions for frequency deviation, occupancy frequency bandwidth and spurious emission level.

Consequently, the ESL needs to use, as a radio communication circuit, a proper circuit including a quartz oscillator with high frequency stability and a radio frequency filter with high selectivity, resulting in an increase in cost.

Moreover, the ESL that produces an output of 10 mW has a large power consumption. If it is driven by a cell, power consumption is great and the cell needs to be changed at short cycles.

Jpn. Pat. Appln. KOKAI Publication No. 63-87837, for instance, discloses a radio data communication system aiming at solving the above problems. This communication system, as shown in FIG. 10, has a private branch radio station A-1. The radio station A-1 transmits/receives data which is transmittable/receivable in a predetermined area R including a plurality of service areas R1, R2, R3, . . . .

The private branch radio station A-1 is connected by means of a transmission path to one of the service areas, for example, a weak-radio-wave radio relay station A-2 having the service area R1. Thus, the radio station A-1 and relay station A-2 constitute a stationary radio station network.

Using relatively strong transmission radio waves, the private branch radio station A-1 transmits data to a plurality of data communication mobile radio terminals A-3 to A-n, which use weak radio waves and are present within the area R including the service areas R1, R2, R3.

When data is to be transmitted from each data communication mobile radio terminal, A-3 to A-n, to the private-branch radio station A-1, the data communication mobile radio terminal, A-3 to A-n, first sends the data to the radio relay station A-2 in the service area using weak radio waves. The radio relay station A-2 then sends the received data to the private branch radio station A-1 using relatively strong transmission radio waves.

When this radio data communication system is applied to the ESL system, the data communication mobile radio terminals correspond to the electronic shelf labels (ESLs). Accordingly, it is assumed that the ESL transmits data to the radio relay station A-2.

In one method of installing the radio relay station A-2, the radio relay station A-2 may be disposed on the ceiling just above the shelf. However, if the height of the ceiling is great, the distance between the ESL and the radio relay station A-2 increases. In such a case, if the ESL uses weak radio waves, the service area that the radio relay station can manage is narrowed.

In order to solve this problem, the radio relay station may be directly disposed on the shelf. Most of shelves are not equipped with power supply wiring, since they are frequently moved. Thus, if the radio relay station is directly disposed on the shelf, the radio relay station would be battery-powered.

In some cases, about 600 kinds of products are densely arranged in one shelf. In such cases, as many (about 600) ESLs are to be disposed on the shelf.

Accordingly, one radio relay station performs radio communication, while managing about 600 ESLs.

Under the circumstances, the radio relay station has to radio-relay a great number of electronic texts. If the radio relay station is battery-powered, the power consumption of the battery is high, and frequent replacement of the battery is necessitated.

BRIEF SUMMARY OF THE INVENTION

The object of the present invention is to decrease a transmission/reception operation time period in a radio relay station, and, when the radio relay station and electronic shelf labels (ESLs) are powered by cells, to reduce the power consumption in the ESLs and increase the lifetime of cells, and also to reduce the power consumption in the radio relay station and increase the lifetime of the cell.

To achieve the object, the present invention provides an electronic shelf label (ESL) system comprising: a plurality of electronic shelf labels (ESLs), disposed on either of a shelf and products, for displaying information including products information; an electronic shelf label (ESL) server for managing the ESLs and transmitting information including the products information with ID information to the ESLs; a radio communication base station for radio-transmitting the information from the ESL server to the ESLs; and a radio relay station for receiving response information from each of the ESLs and transmitting information based on the response information to the radio communication base station.

Each of the ESLs radio-transmits the response information with ID information by means of weak radio waves, upon receiving the information from the radio communication base station.

The radio relay station is located closer to the ESLs than to the radio communication base station. The radio relay station receives the response information on the weak radio waves from each of the ESLs and also receives the information transmitted from the radio communication base station to the ESLs. The radio relay station detects, on the basis of the ID information, the ESL which failed to normally receive the information, and radio-transmits to the radio communication base station information indicative of this ESL.

The radio communication base station, upon receiving the information indicative of the ESL which failed to normally receive the information, transmits this information to the ESL server. The ESL server, upon receiving the information indicative of the ESL which failed to normally receive the information, re-transmits the information to this ESL via the radio communication base station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (First Embodiment)

Figure 1:
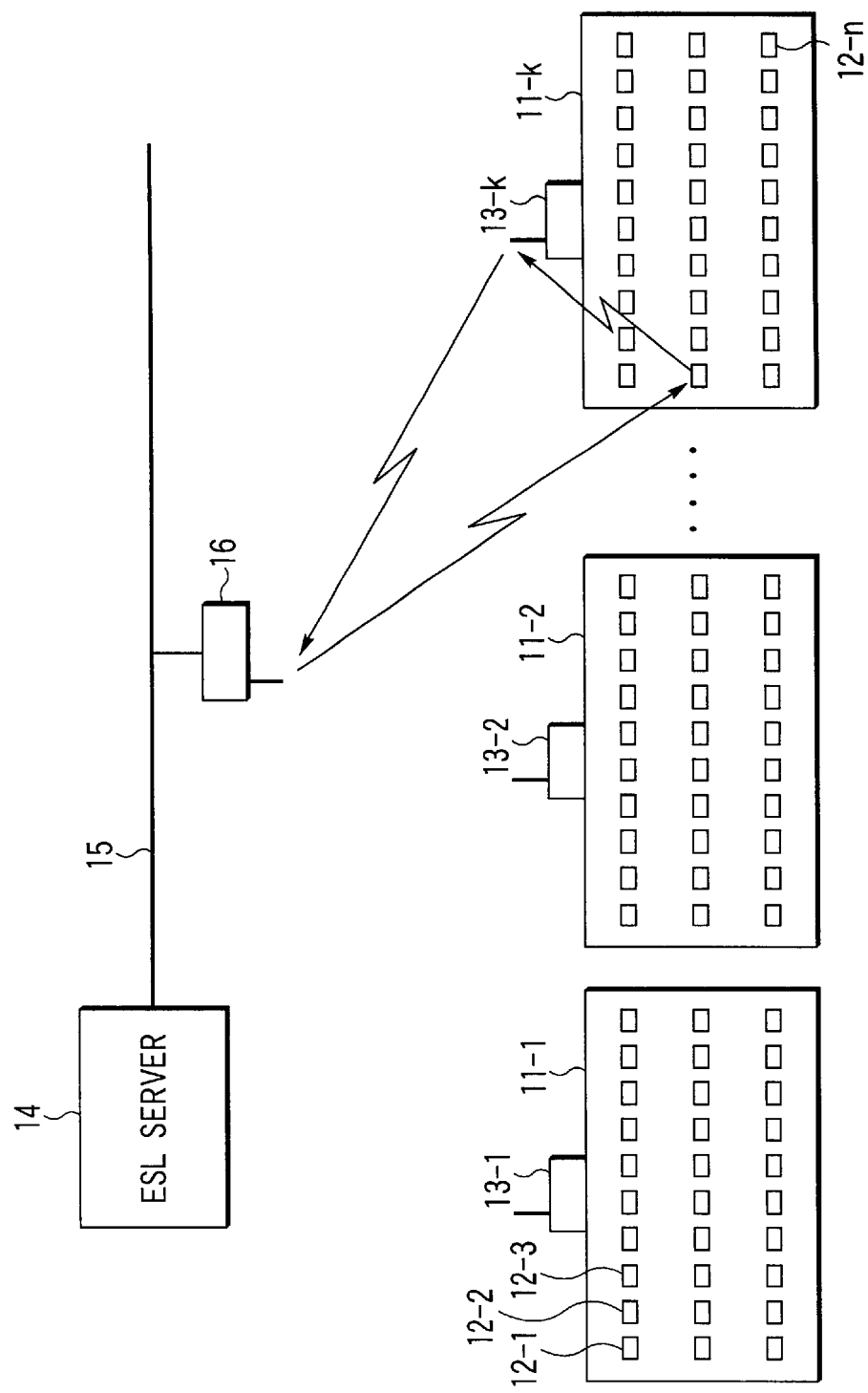
FIG. 1 is a block diagram showing the structure of an electronic shelf label (ESL) system according to a first embodiment of the present invention.

In an electric shelf label (ESL) system according to a first embodiment of the invention, a k-number of shelves 11-1, 11-2, . . . , 11-k are arranged on a sales floor in a store, as shown in FIG. 1.

An n-number of cell-powered electronic shelf labels (ESLs) 12-1, 12-2, 12-3, . . . , 12-n are disposed on the shelves 1-1, 1-2, . . . , 1-k so as to correspond to respective products.

Each of the shelves 11-1 to 11-k constitutes one group and has a width of about 10 m. Battery-powered radio relay stations 13-1, 13-2, . . . , 13-k are disposed on the shelves 11-1 to 11-k, respectively.

The radio reception range of each radio relay station, 13-1, 13-2, . . . , 13-k, covers the ESLs of each of the shelves 11-1 to 11-k which constitute groups, respectively. The radio relay station receives weak radio waves from each of the ESLs within the radio reception range.

An ESL server 14 is installed on a backyard area in the store. The ESLs 12-1 to 12-k are managed by the ESL server 14.

The ESL server 14 is connected to a radio communication base station 16 via a wired network 15. The base station 16 is installed, for example, on a ceiling of the sales space.

The wired network 15 is constituted by using a LAN with a transmission rate of about 10 Mbps.

The number of radio communication base stations is not limited to one. In a large-scale store, for example, plural radio communication base stations are connected to the wired network 15.

The radio communication base station 16 has a radio reception range of about 30 m in radius. The ESLs 12-1 to 12-n of the shelves 11-1 to 11-k are present within this radio reception range.

Figure 2:
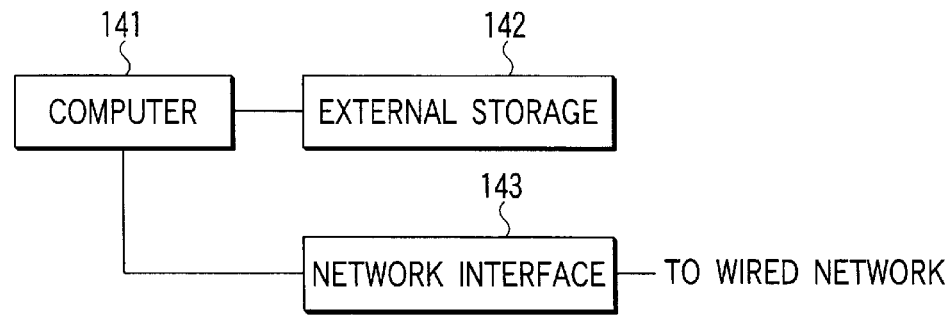
FIG. 2 is a block diagram showing the structure of an ESL server according to the first embodiment of the invention.

As is shown in FIG. 2, the ESL server 14 comprises a computer 141, an external storage device 142 and a network interface 143 connected to the wired network 15.

The external storage device 142 of the ESL server 14 stores, e.g. files wherein products information on products names/products codes and products prices is associated with ID information of the ESLs which display the products information.

In the ESL server 14, the computer 141 controls the network interface 143 so as to radio-transmit products information and control information to the ESLs 12-1 to 12-n via the wired network 15 and radio communication base station 16, and to manage and control the entire system.

Figure 3:
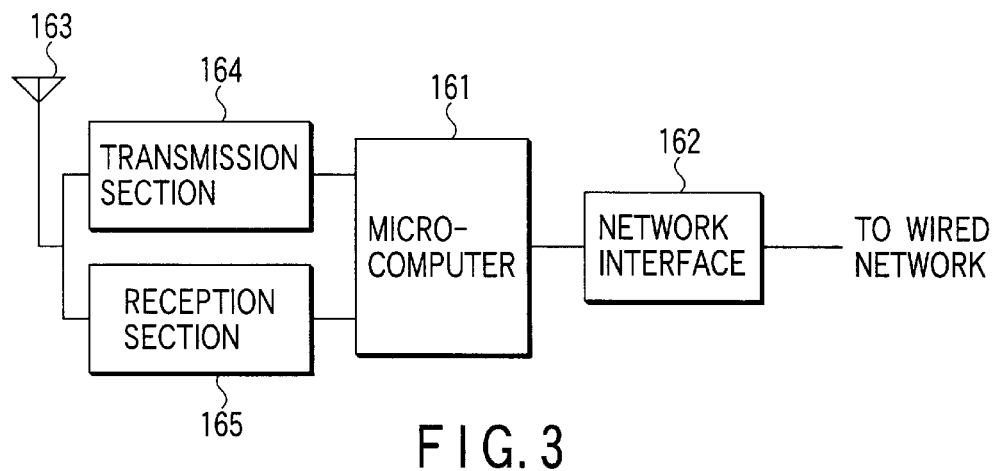
FIG. 3 is a block diagram showing the structure of a radio communication base station according to the first embodiment of the invention.

As is shown in FIG. 3, the radio communication base station 16 comprises a microcomputer 161, a network interface 162 connected to the wired network 15, a 2.4 GHz frequency-band transmission section 164 and a 2.4 GHz frequency-band reception section 165.

The 2.4 GHz frequency-band transmission section 164 radio-transmits the products information and control information received from the ESL server 14 via an antenna 163 with a transmission power of 10 mW according to the standards of 2.4 GHz wireless LANs.

The 2.4 GHz frequency-band reception section 165 receives transmission waves from the radio relay stations 13-1 to 13-$k$ via the antenna 163.

Figure 4:
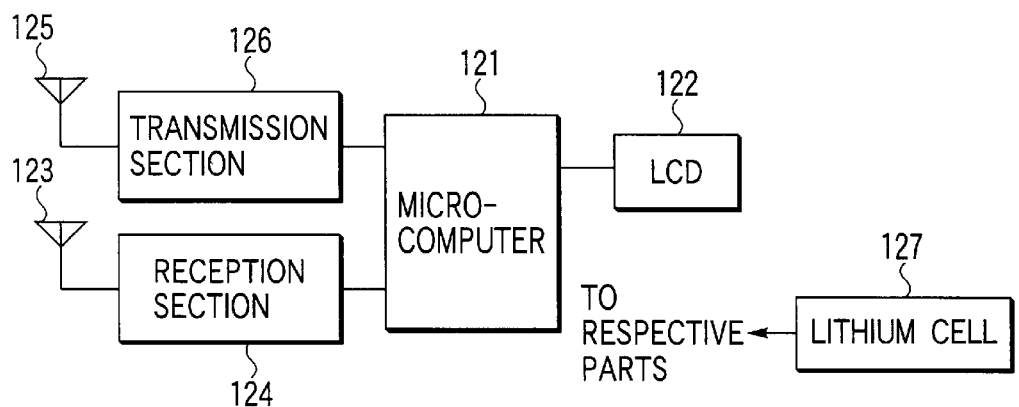
FIG. 4 is a block diagram showing the structure of an ESL according to the first embodiment of the invention.

As is shown in FIG. 4, each of the electronic shelf labels (ESLs) 12-1 to 12-$n$ comprises a microcomputer 121 constituting a controller main body, a liquid crystal display (LCD) 122 for displaying received information such as products information, a 2.4 GHz frequency-band reception section 124, a 300 MHz frequency-band transmission section 126, and a lithium cell 127.

The 2.4 GHz frequency-band reception section 124 receives 2.4 GHz frequency-band radio waves from the radio communication base station 16 via an antenna 123.

The 300 MHz frequency-band transmission section 126 transmits a 300 MHz frequency-band weak radio response via an antenna 125 to the radio relay station of the group to which this ESL belongs. The lithium cell 127 supplies power to the respective parts of this ESL.

Response information sent from each ESL, 12-1 to 12-$n$, to the radio relay station is classified into an affirmative response indicating that information from the radio communication base station 16 has been normally received, and a negative response indicating that information from the radio communication base station 16 has failed to be normally received.

If each ESL, 12-1 to 12-$n$, is unable to receive information directed to its own address from the radio communication base station 16 owing to a bad radio propagation condition, it stands in a non-response state and sends no response to the radio relay station.

Since the 300 MHz frequency-band transmission section 126 is designed according to the weak-radio-wave standards, such a strict frequency deviation as required in wireless LANs is not needed. The transmission section 126 may have an internal radio-frequency transmission unit composed of an inexpensive quartz oscillator such as one used for a clock, and a simple circuit free from temperature compensation.

Since the transmission power of the 300 MHz frequency-band transmission section 126 is very small, compared to wireless LANs, its internal transmission amplification circuit may be composed of an inexpensive, small-sized circuit of general-purpose transistors for weak signals, etc.

In addition, no specifications on transmission spurious emission levels are set for the transmission power of the 300 MHz frequency-band transmission section 126. Thus, its internal transmission filter is composed of a small-sized, inexpensive radio-frequency filter such as an LC passive circuit.

The 2.4 GHz frequency-band reception section 124 performs intermittent receiving operations under control of the microcomputer 121 in order to reduce power consumption.

With the above structure, each ESL, 12-1 to 12-$n$, can operate seven years or more without replacement of the lithium cell 127.

Figure 5:
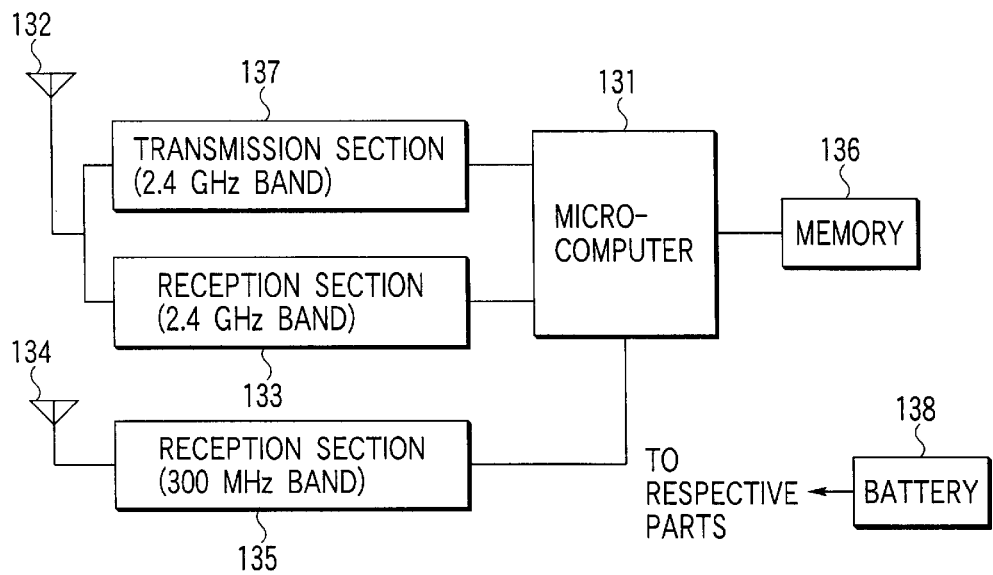
FIG. 5 is a block diagram showing the structure of a radio relay station according to the first embodiment of the invention.

As is shown in FIG. 5, each of the radio relay stations 13-1 to 13-$k$ comprises a microcomputer 131 constituting a controller main body, a 2.4 GHz frequency-band reception section 133, a 300 MHz frequency-band reception section 135, a memory 136, a 2.4 GHz frequency-band transmission section 137, and a battery 138 for supplying power to respective parts of the radio relay station.

The 2.4 GHz frequency-band reception section 133 receives and monitors via an antenna 132 the information transmitted from the radio communication base station 16 to each ESL, 12-1 to 12-$n$.

The 300 MHz frequency-band reception section 135 receives via an antenna 134 the weak radio response information from the ESL in its group.

The memory 136 stores ID information of the ESL contained in the information monitored by the 2.4 GHz frequency-band reception section 133 and ID information of the ESL contained in the response information received by the 300 MHz frequency-band reception section 135.

The 2.4 GHz frequency-band transmission section 137 radio-transmits the ID information of the ESL, which sends a negative response as response information, and the ID information of the ESL that sends no response, to the radio communication base station 16 via the antenna 132 with a transmission power of 10 mW. This transmission power accords with the standards of 2.4 GHz frequency-band LANs.

The microcomputer 131 compares the ID information contained in the monitored information and the ID information contained in the response information, which are stored in the memory 136, thus specifying the ESL that has sent no response.

The radio relay stations 13-1 to 13-$k$ are disposed on the shelves 11-1 to 11-$k$ in a one-to-one relationship. Accordingly, the number of the radio relay stations used in the store is equal to the number of the shelves. Since the number of radio relay stations used in the store is not so great, replacement of batteries is not time-consuming. Thus, an inexpensive zinc-carbon dry cell with a lifetime of about one year may be used for the battery 138 with no problem.

Figure 6:
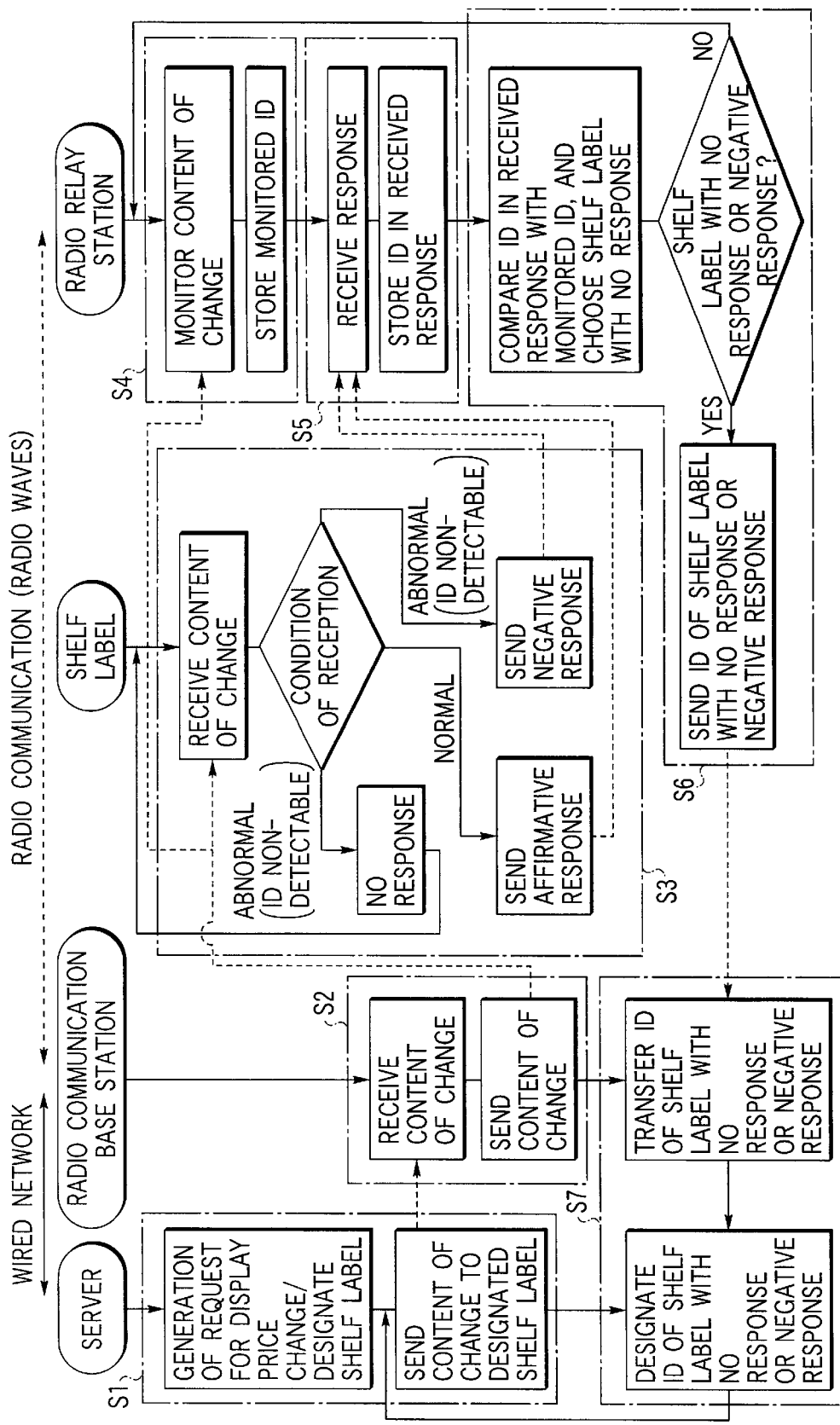
FIG. 6 is a flow chart illustrating the operation of the ESL system according to the first embodiment of the invention.

The operation of the ESL system will now be described with reference to a flow chart of FIG. 6.

The ESL server 14 stores files wherein three information items are associated, that is, products names/products codes, price information, and ID information of ESLs.

When sales prices of products are to be changed, a store clerk operates the computer 141 of the ESL server 14 (step S1). If the contents of the files are updated, a price change request for changing the price displayed on the ESL is issued and the ESL associated with the price change is designated.

Price change information for the designated ESL is transmitted from the ESL server 14. The price change information comprises a products name/code of a commodity for which the price change is to be made, new price information, and ID information of the ESL.

The price change information is transmitted from the ESL server 14 to the radio communication base station 16 via the wired network 15.

In step S2, the radio communication base station 16 transmits the received change information to the ESLs within the range of 30 m in radius by means of the 2.4 GHz frequency-band wireless LAN.

If there are a plurality of commodities whose prices are to be changed, change information needs to be sent to different ESLs. Thus, the radio communication base station 16 successively transmits change information units at intervals of about 10 msec.

Each ESL is normally waiting for incoming radio signals, performing intermittent receiving operations. If the ESL has received an incoming radio signal, it performs in step S3 one of the following three operations in accordance with the radio propagation condition at the time of reception.

If the ESL has normally received all change information, it sends an affirmative response to the radio relay station of its own group by means of 300 MHz frequency-band weak radio waves.

If the ESL has failed to normally receive price information, etc. but has received its own ID information, it sends a negative response to the radio relay station of its own group by means of 300 MHz frequency-band weak radio waves.

If the ESL has received neither its own ID information nor other price information, etc., it stands in a non-response state. That is, the ESL sends no response information and waits for the next incoming radio waves.

On the other hand, in step S4, the radio relay station picks up and monitors the change information that has been transmitted to the ESL from the radio communication base station 16 in step S2. The radio relay station extracts the ID information of the ESL from the monitored information and stores it in the memory 136.

Then, in step S5, the radio relay station receives the affirmative response or negative response which has been transmitted from the ESL in step S3. The radio relay station extracts the ID information from the affirmative response or negative response and stores it in the memory 136.

Subsequently, in step S6, the radio relay station compares the ID information contained in the response information and the monitored ID information, which are stored in the memory 136, and the radio relay station extracts, as non-response ID information, that ID information in the monitored ID information, which is not included in the ID information of the response information.

If there is neither non-response ID information nor negative response ID information, the radio relay station determines that all ESLs that should receive change information have normally received the change information. Thus, the radio relay station returns to the initial state.

However, if there is either non-response ID information nor negative response ID information, the radio relay station sends such ID information to the radio communication base station 16 by means of the 2.4 GHz frequency-band wireless LAN.

In step S7, if the radio communication base station 16 has received the ID information from the radio relay station, it transfers the received ID information to the ESL server 14 via the wired network 15. If the ESL label server 14 has received the ID information, it designates the change information of the ESL corresponding to the received ID information as an information item to be retransmitted.

In step S1, the ESL server 14 retransmits the change information to the ESL which has been specified as the object for change information retransmission.

In this manner, the radio relay station monitors the change information transmitted to the ESL from the radio communication base station, extracts the ID information contained in the monitored change information, and stores it in the memory. When the radio relay station has received the response information from the ESL, it determines whether there is non-response ID information by comparison with the monitored information. Only when it has been determined that there is non-response ID information or negative response ID information, does the radio relay station send such ID information to the radio communication base station 16, thereby prompting the ESL server 14 to retransmit the change information.

Accordingly, the amount of information to be radio-transmitted from the radio relay station to the radio communication base station is small, and the transmission/reception operation time of the radio relay station is decreased. Thereby, the power consumption of the radio relay station can be reduced and the lifetime of the cell increased.

It will suffice if the ESL transmits the response signal to the nearby radio relay station by means of weak radio waves. Accordingly, the transmission power is decreased, the power consumption of the ESL is reduced, and the lifetime of the cell is increased.

(Second Embodiment)

Figure 7:
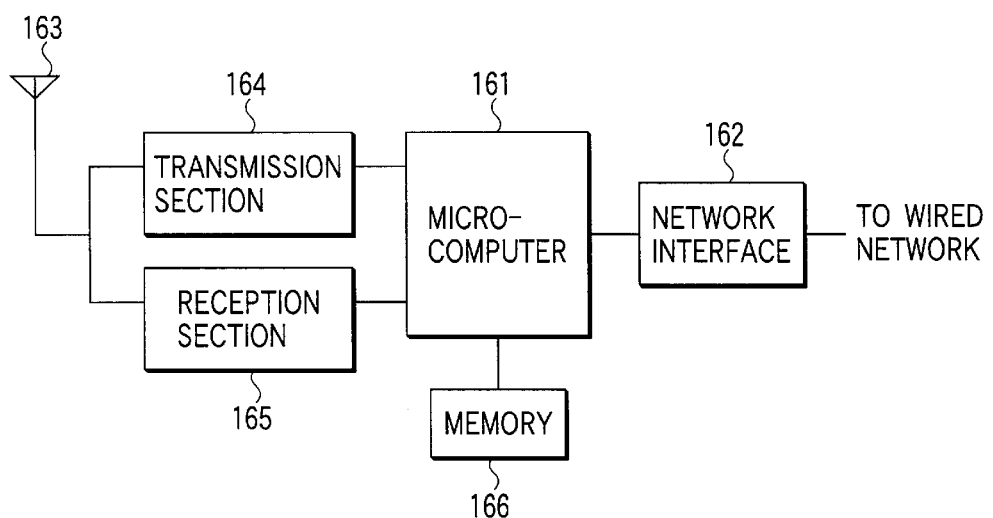
FIG. 7 is a block diagram showing the structure of a radio communication base station according to a second embodiment of the invention.

In an ESL system according to a second embodiment of the invention, the radio communication base station 16, as shown in FIG. 7, includes a memory 166. The other structural features of the ESL system of the second embodiment are the same as those of the ESL system of the first embodiment.

Figure 8:
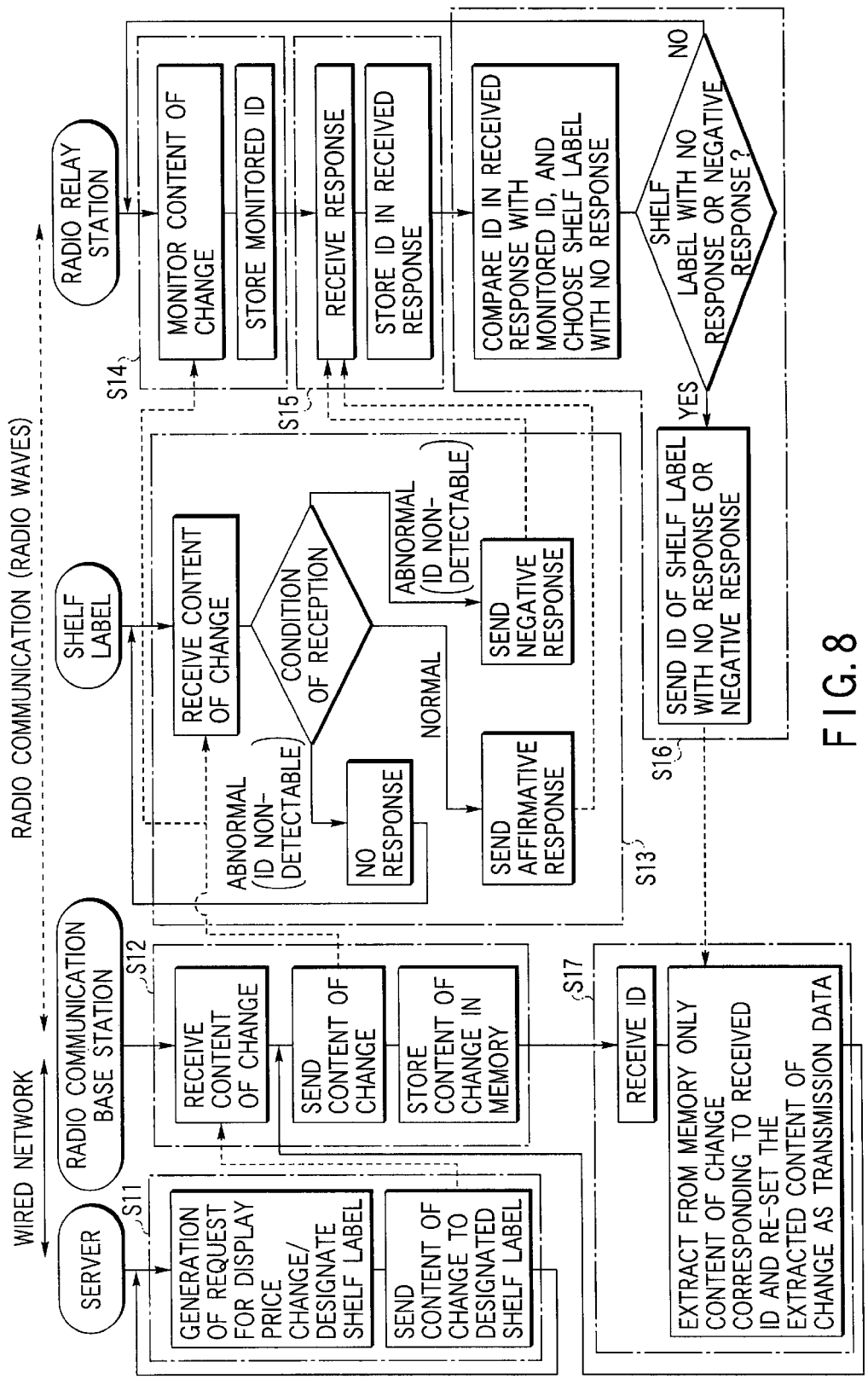
FIG. 8 is a flow chart illustrating the operation of an ESL system according to the second embodiment of the invention.
Figure 9:
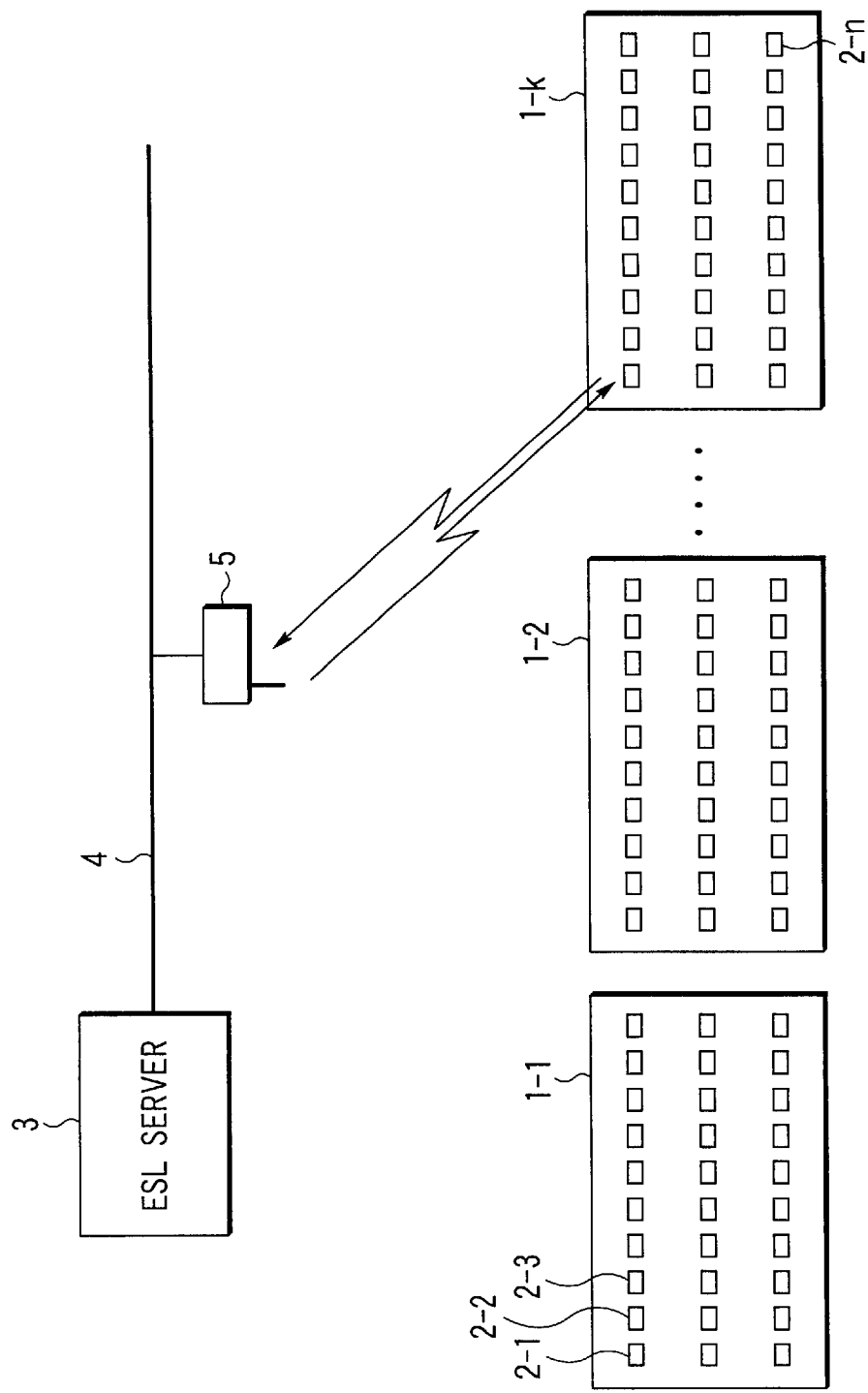
FIG. 9 is a block diagram showing prior art.
Figure 10:
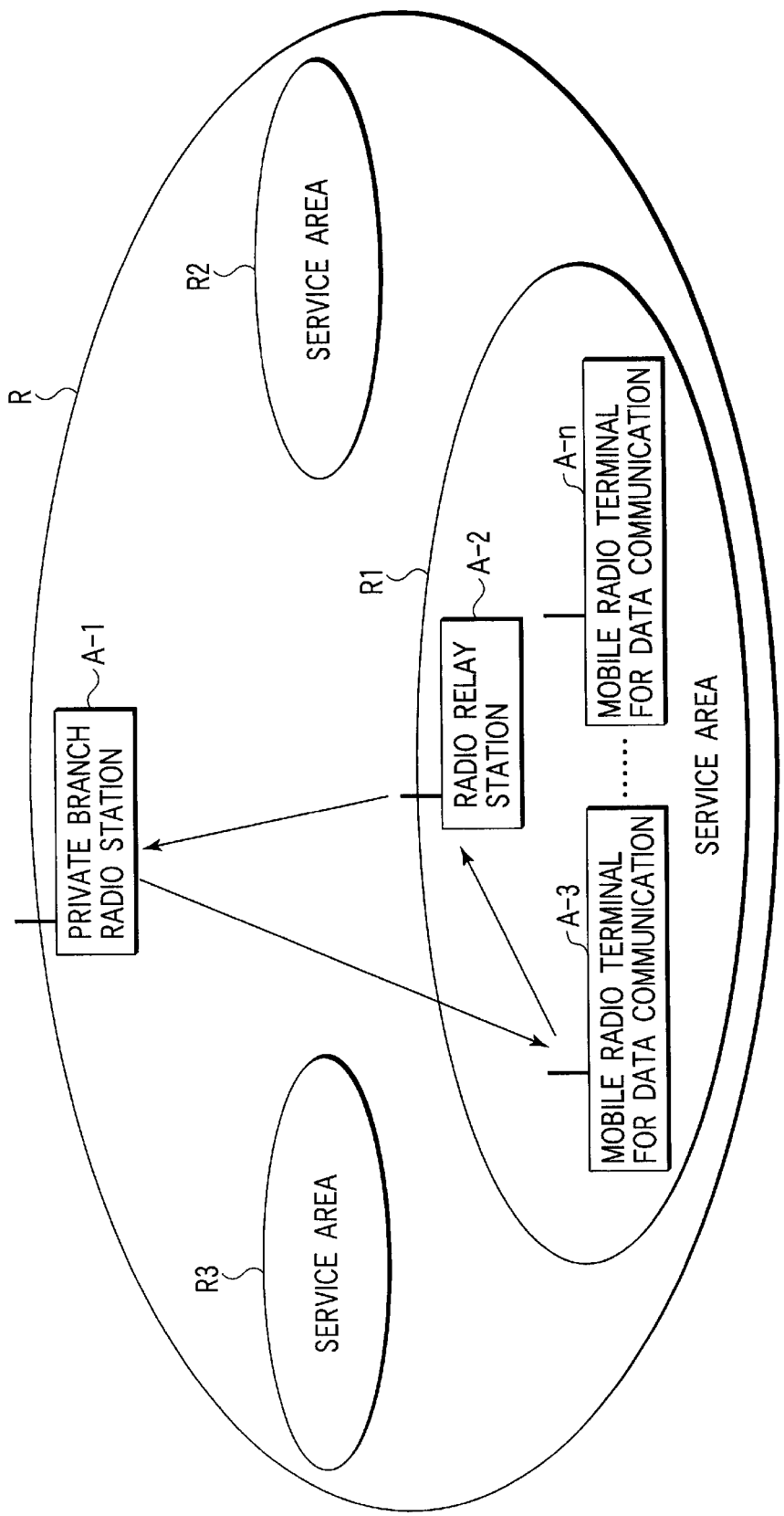
FIG. 10 is a block diagram showing other prior art.

The operation of the ESL system will now be described with reference to a flow chart of FIG. 8.

When sales prices of products are to be changed, a store clerk operates the computer 141 of the ESL server 14 (step S11). If the contents of the files are updated, a price change request for changing the price displayed on the ESL is issued and the ESL associated with the price change is designated.

Price change information for the designated ESL is transmitted from the ESL server 14.

The price change information is transmitted from the ESL server 14 to the radio communication base station 16 via the wired network 15.

In step S12, the radio communication base station 16 transmits the received change information to the ESLs within the range of 30 m in radius by means of the 2.4 GHz frequency-band wireless LAN.

If there are a plurality of commodities whose prices are to be changed, change information needs to be sent to different ESLs. Thus, the radio communication base station 16 successively transmits change information units at intervals of about 10 msec. The transmitted change information is stored in the memory 166.

Each ESL is normally waiting for incoming radio signals, performing intermittent receiving operations. If the ESL has received an incoming radio signal, it performs in step S13 one of the following three operations in accordance with the radio propagation condition at the time of reception.

If the ESL has normally received all change information, it sends an affirmative response to the radio relay station of its own group by means of 300 MHz frequency-band weak radio waves.

If the ESL has failed to normally receive price information, etc. but has received its own ID information, it sends a negative response to the radio relay station of its own group by means of 300 MHz frequency-band weak radio waves.

If the ESL has received neither its own ID information nor other price information, etc., it stands in a non-response state. That is, the ESL sends no response information and waits for the next incoming radio waves.

On the other hand, in step S14, the radio relay station picks up and monitors the change information that has been transmitted to the ESL from the radio communication base station 16 in step S12. The radio relay station extracts the ID information of the ESL from the monitored information and stores it in the memory 136.

Then, in step S15, the radio relay station receives the affirmative response or negative response which has been transmitted from the ESL in step S13. The radio relay station extracts the ID information from the affirmative response or negative response and stores it in the memory 136.

Subsequently, in step S16, the radio relay station compares the ID information contained in the response information and the monitored ID information, which are stored in the memory 136, and the radio relay station extracts, as non-response ID information, that ID information in the monitored ID information, which is not included in the ID information of the response information.

If there is neither non-response ID information nor negative response ID information, the radio relay station determines that all ESLs that should receive change information have normally received the change information. Thus, the radio relay station returns to the initial state.

However, if there is either non-response ID information nor negative response ID information, the radio relay station sends such ID information to the radio communication base station 16 by means of the 2.4 GHz frequency-band wireless LAN.

In step S17, if the radio communication base station 16 has received the ID information from the radio relay station, it designates only that change information in the change information stored in the memory 166, which corresponds to the ID information of the ESL from which no response was issued or a negative response was issued, as an information item to be retransmitted.

In step S12, the radio communication base station 16 retransmits the change information to the ESL which has been specified as the object for change information retransmission.

In this manner, when the radio communication base station 16 transmits price change information to the ESL, it stores the content of the change information in the memory 166.

In addition, the radio relay station monitors the change information transmitted to the ESL from the radio communication base station, extracts the ID information contained in the monitored change information, and stores it in the memory. When the radio relay station has received the response information from the ESL, it determines whether there is non-response ID information by comparison with the monitored information. Only when it has been determined that there is non-response ID information or negative response ID information, does the radio relay station send such ID information to the radio communication base station 16.

The radio communication base station 16 designates only that change information in the change information stored in the memory 166, which corresponds to the ID information of the ESL from which no response was issued or a negative response was issued, as an information item to be retransmitted. The radio communication base station 16 retransmits the change information to the ESL which has been specified as the object for change information retransmission.

Accordingly, in the second embodiment, too, the amount of information to be radio-transmitted from the radio relay station to the radio communication base station is small, and the transmission/reception operation time of the radio relay station is decreased. Thereby, the power consumption of the radio relay station can be reduced and the lifetime of the cell increased.

In the second embodiment, too, it will suffice if the ESL transmits the response signal to the nearby radio relay station by means of weak radio waves. Accordingly, the transmission power is decreased, the power consumption of the ESL is reduced, and the lifetime of the cell is increased.

Furthermore, in the second embodiment, the radio communication base station 16 stores the change information sent to the ESL in the memory 166. When the radio communication base station 16 has received the ID information of the ESL from which no response was issued or the negative response was issued, the associated change information is read out of the memory 166 and retransmitted to the corresponding ESL.

Accordingly, the ESL server 14 is not required to carry out a retransmission process, and the load on the ESL server 14 is decreased.

In each of the above embodiments, when the ESL has failed to normally receive the change information, it takes two types of response states: one in which the negative response is transmitted, and the other in which no response is transmitted. However, the response states are not limited to these two. For example, when the ESL has failed to normally receive the change information, it may take only one response state, that is, one in which the negative response is transmitted, or one in which no response is transmitted.

Each of the above embodiments is directed to the mode in which the ESLs are disposed on the shelves. However, the ESLs may be disposed on the products displayed on the shelves.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic shelf label (ESL) system comprising:
   a plurality of electronic shelf labels (ESLs), each disposed on one of a shelf and a product, for displaying information including product information;
   an electronic shelf label (ESL) server for managing the ESLs and management information including the product information with ID information;
   a radio communication base station for radio-transmitting the management information from the ESL server to the ESLs; and
   a radio relay station for receiving response information from each of the ESLs and transmitting relay information based on the response information to the radio communication base station,
   wherein upon receiving the management information from the radio communication base station, each of the ESLs radio-transmits the response information with ID information by means of weak radio waves,
   wherein the radio relay station is located close to the ESLs than to the radio communication base station, and the radio relay station receives the response information on the weak radio waves from each of the ESLs and also receives the management information transmitted from The radio communication base station to the ESLs,
   wherein the radio relay station is adapted to detect, based on the ID information included in the management information and the ID information included in the response information, any ESL which failed to normally receive the management information, and radio-transmits to the radio communication base station reception failure information indicative of the ESL which failed to normally receive the management information,
   wherein the radio communication base station, upon receiving the failure information, transmits the reception failure information to the ESL server, and
   wherein the ESL server, upon receiving the reception failure information, re-transmits the management information to the detected ESL via the radio communication base station.

2. The electronic shelf label (ESL) system according to claim 1, wherein the radio relay station is adapted to detect, based on the ID information, any ESL which sent out negative response information indicative of reception abnormality, and radio-transmits to the radio communication base station reception abnormality information indicative of the detected ESL, wherein the radio communication base station, upon receiving the reception abnormality information, transmits the reception abnormality information to the ESL server, and wherein the ESL server, upon receiving the reception abnormality information, re-transmits the management information via the radio communication base station to the detected ESL.

3. The electronic shelf label (ESL) system according to claim 1, wherein the radio relay station is adapted to detect, based on the ID information, any ESL which did not send response information, and radio-transmits to the radio communication base station response failure information indicative of the detected ESL, wherein the radio communication base station, upon receiving the response failure information, transmits the response failure information to the ESL server, and wherein the ESL server, upon receiving the response failure information, re-transmits the management information via the radio communication base station to the detected ESL.

4. The electronic shelf label (ESL) system according to claim 1, wherein the radio relay station is adapted to detect, based on the ID information, any ESL which sent out negative response information indicative of reception abnormality and any ESL which did not send response information, and radio-transmits to the radio communication base station reception abnormality/response failure information indicative of the detected ESLs, wherein the radio communication base station, upon receiving the reception abnormality/response failure information, transmits the reception abnormality/ response failure information to the ESL server, and wherein the ESL server, upon receiving the reception abnormality response failure information, re-transmits the management information via the radio communication base station to the detected ESLs.

5. The electronic shelf label (ESL) system according to claim 1, wherein the radio communication base station includes storage means for storing the management information which is transmitted from the ESL server to the ESLs, wherein the radio relay station is adapted to detect, based on the ID information, any ESL which sent out negative response information indicative of reception abnormality, and radio-transmits to the radio communication base station reception abnormality information indicative of the detected ESL, and wherein the radio communication base station, upon receiving the reception abnormality information, reads associated management information associated with the detected ESL from the storage means and re-transmits the associated management information to the detected ESL.

6. The electronic shelf label (ESL) system according to claim 1, wherein the radio communication base station includes storage means for storing the management information which is transmitted from the ESL server to the ESLs, wherein the radio relay station is adapted to detect, based on the ID information, any ESL which did nor send any response information, and radio-transmits to the radio communication base station response failure information indicative of said ESL, and wherein the radio communication base station, upon receiving the response failure information, reads out associated management information associated with the detected ESL from the storage means and re-transmits the associated management information to the detected ESL.

7. The electronic shelf label (ESL) system according to claim 1, wherein the radio communication base station includes storage means for storing the management information which is transmitted from the ESL server to the ESLs, wherein is adapted to detect, based on the ID information, any ESL which sent out negative response information indicative of reception abnormality and any ESL which did not send response information, and radio-transmits to the radio communication base station reception abnormality/response failure information indicative of the detected ESLs, and wherein the radio communication base station, upon receiving the reception abnormality/response failure information, reads out associated management information associated with the detected ESLs from the storage means and re-transmits the associated management information to the detected ESLs.

* * * * *